(12) United States Patent
Versteyhe et al.

(10) Patent No.: US 9,404,414 B2
(45) Date of Patent: Aug. 2, 2016

(54) INTERNAL COMBUSTION ENGINE COUPLED TURBOCHARGER WITH AN INFINITELY VARIABLE TRANSMISSION

(71) Applicant: DANA LIMITED, Maumee, OH (US)

(72) Inventors: Mark RJ Versteyhe, Oostkamp (BE); Thibaut E Duchene, Woluwe-Saint-Lambert (BE); Matthias W J Byltiauw, Hooglede (BE); Donald J Rembroski, Ann Arbor, MI (US)

(73) Assignee: DANA LIMITED, Maumee, OH (US)

( * ) Notice: Subject to any disclaimer, the term of this patent is extended or adjusted under 35 U.S.C. 154(b) by 0 days.

(21) Appl. No.: 14/175,584

(22) Filed: Feb. 7, 2014

(65) Prior Publication Data

US 2014/0223901 A1 Aug. 14, 2014

Related U.S. Application Data

(60) Provisional application No. 61/762,379, filed on Feb. 8, 2013.

(51) Int. Cl.
*F02B 37/00* (2006.01)
*F02B 37/04* (2006.01)
*F02B 39/04* (2006.01)
(Continued)

(52) U.S. Cl.
CPC ............... *F02B 37/04* (2013.01); *F02B 37/105* (2013.01); *F02B 39/04* (2013.01); *F02B 41/10* (2013.01); *F02C 3/113* (2013.01); *F02C 6/12* (2013.01); *F02C 7/36* (2013.01); *G06F 8/65* (2013.01); *H02K 49/10* (2013.01); *H02K 49/102* (2013.01); *F05D 2220/40* (2013.01);
(Continued)

(58) Field of Classification Search
USPC ............................ 60/607, 608, 605.1; 74/650
See application file for complete search history.

(56) References Cited

U.S. PATENT DOCUMENTS 1,063,244 A 6/1913 Ludwig
1,215,969 A 2/1917 Thomas
(Continued)

FOREIGN PATENT DOCUMENTS

AU 2011224083 A1 10/2011
CN 101617146 A 12/2009
(Continued)

OTHER PUBLICATIONS

Machine Translation DE 1237380 Published on Mar. 1967.*

(Continued)

*Primary Examiner* — Audrey K Bradley
*Assistant Examiner* — Dapinder Singh
(74) *Attorney, Agent, or Firm* — Wilson Sonsini Goodrich & Rosati

(57) ABSTRACT

A turbocharger for use with an internal combustion engine is provided. The turbocharger comprises a differential device having a carrier portion, a compressor portion, and a turbine portion. The compressor portion is in driving engagement with a first portion of the differential device. The turbine portion is in driving engagement with a second portion of the differential device. The carrier portion of the differential device is in driving engagement with an infinitely variable transmission. The infinitely variable transmission is in driving engagement with the internal combustion engine. The turbocharger is simply controlled, reduces turbo lag, decreases a boost threshold of the turbocharger, and increases an efficiency of the internal combustion engine.

16 Claims, 4 Drawing Sheets

(51) Int. Cl.

| | | |
|---|---|---|
| *F02B 41/00* | (2006.01) | |
| *F02B 37/10* | (2006.01) | |
| *F02B 41/10* | (2006.01) | |
| *F02C 3/113* | (2006.01) | |
| *F02C 6/12* | (2006.01) | |
| *G06F 9/445* | (2006.01) | |
| *H02K 49/10* | (2006.01) | |
| *F02C 7/36* | (2006.01) | |
| *F16H 15/40* | (2006.01) | |

(52) U.S. Cl.
CPC .............. *F16H 15/40* (2013.01); *Y02T 10/144* (2013.01); *Y02T 10/163* (2013.01)

(56) References Cited

U.S. PATENT DOCUMENTS

| | | |
|---|---|---|
| 1,526,140 A | 2/1925 | Gruver |
| 2,019,006 A | 10/1935 | Ferrarl |
| 2,060,884 A | 11/1936 | Madle |
| 2,405,201 A | 8/1946 | Franck |
| 2,660,897 A | 12/1953 | Neidhart et al. |
| 2,729,118 A * | 1/1956 | Emslie .......................... 74/650 |
| 2,931,235 A | 4/1960 | Hayward |
| 3,203,278 A | 8/1965 | General |
| 3,407,687 A | 10/1968 | Hayashi |
| 3,470,720 A | 10/1969 | Phillip et al. |
| 3,583,060 A | 6/1971 | Maurice |
| 3,765,270 A | 10/1973 | Lemieux |
| 3,774,280 A | 11/1973 | Eklund et al. |
| 3,831,245 A | 8/1974 | Amos |
| 3,894,559 A | 7/1975 | DePuy |
| 4,046,988 A | 9/1977 | Okuda et al. |
| 4,226,140 A | 10/1980 | Gaasenbeek |
| 4,333,358 A | 6/1982 | Grattapaglia |
| 4,368,572 A | 1/1983 | Kanazawa et al. |
| 4,464,952 A | 8/1984 | Stubbs |
| 4,693,134 A | 9/1987 | Kraus |
| 4,731,044 A | 3/1988 | Mott |
| 4,756,211 A | 7/1988 | Fellows |
| 4,784,017 A | 11/1988 | Johnshoy |
| 4,856,371 A | 8/1989 | Kemper |
| 4,856,374 A | 8/1989 | Kreuzer |
| 4,950,208 A | 8/1990 | Tomlinson |
| 4,963,122 A | 10/1990 | Ryan |
| 4,963,124 A | 10/1990 | Takahashi et al. |
| 5,109,962 A | 5/1992 | Sato |
| 5,217,412 A | 6/1993 | Indlekofer et al. |
| 5,230,670 A | 7/1993 | Hibi |
| 5,238,460 A | 8/1993 | Esaki et al. |
| 5,318,486 A | 6/1994 | Lutz |
| 5,390,759 A | 2/1995 | Gollner |
| 5,401,221 A | 3/1995 | Fellows et al. |
| 5,520,588 A | 5/1996 | Hall, III |
| 5,527,231 A | 6/1996 | Seidel et al. |
| 5,577,423 A | 11/1996 | Mimura |
| 5,599,251 A | 2/1997 | Beim et al. |
| 5,659,956 A | 8/1997 | Braginsky et al. |
| 5,683,322 A | 11/1997 | Meyerle |
| 5,726,353 A | 3/1998 | Matsuda et al. |
| 5,730,678 A | 3/1998 | Larkin |
| 5,766,105 A | 6/1998 | Fellows et al. |
| 5,776,028 A | 7/1998 | Matsuda et al. |
| 5,800,303 A | 9/1998 | Benford |
| 5,860,888 A | 1/1999 | Lee |
| 5,915,801 A | 6/1999 | Taga et al. |
| 5,971,883 A | 10/1999 | Klemen |
| 5,996,226 A | 12/1999 | Gibbs |
| 6,009,365 A | 12/1999 | Takahara et al. |
| 6,045,477 A | 4/2000 | Schmidt |
| 6,053,839 A | 4/2000 | Baldwin et al. |
| 6,059,685 A | 5/2000 | Hoge et al. |
| 6,071,208 A | 6/2000 | Koivunen |
| 6,080,080 A | 6/2000 | Bolz et al. |
| 6,083,135 A | 7/2000 | Baldwin et al. |
| 6,086,504 A | 7/2000 | Illerhaus |
| 6,089,287 A | 7/2000 | Welsh et al. |
| 6,095,942 A | 8/2000 | Yamaguchi et al. |
| 6,155,951 A | 12/2000 | Kuhn et al. |
| 6,217,474 B1 | 4/2001 | Ross et al. |
| 6,251,038 B1 | 6/2001 | Ishikawa et al. |
| 6,273,838 B1 | 8/2001 | Park |
| 6,342,026 B1 | 1/2002 | Takagi et al. |
| 6,358,178 B1 | 3/2002 | Wittkopp |
| 6,371,880 B1 | 4/2002 | Kam |
| 6,481,258 B1 | 11/2002 | Belinky |
| 6,554,735 B2 | 4/2003 | Kanazawa |
| 6,558,285 B1 | 5/2003 | Sieber |
| 6,585,619 B2 | 7/2003 | Henzler |
| 6,609,994 B2 | 8/2003 | Muramoto |
| 6,641,497 B2 | 11/2003 | Deschamps et al. |
| 6,645,106 B2 | 11/2003 | Goo et al. |
| 6,705,964 B2 | 3/2004 | Nagai et al. |
| 6,719,659 B2 | 4/2004 | Geiberger et al. |
| 6,723,016 B2 | 4/2004 | Sumi |
| 6,726,590 B2 | 4/2004 | Henzler et al. |
| 6,733,412 B2 | 5/2004 | Kumagai et al. |
| 6,752,696 B2 | 6/2004 | Murai et al. |
| 6,793,603 B2 | 9/2004 | Teraoka et al. |
| 6,849,020 B2 | 2/2005 | Sumi |
| 6,866,606 B2 | 3/2005 | Ooyama |
| 6,949,045 B2 | 9/2005 | Wafzig et al. |
| 6,979,275 B2 | 12/2005 | Hiraku et al. |
| 7,033,298 B2 | 4/2006 | Usoro et al. |
| 7,074,154 B2 | 7/2006 | Miller |
| 7,104,917 B2 | 9/2006 | Klemen et al. |
| 7,128,681 B2 | 10/2006 | Sugino et al. |
| 7,160,220 B2 | 1/2007 | Shinojima et al. |
| 7,186,199 B1 | 3/2007 | Baxter, Jr. |
| 7,234,543 B2 | 6/2007 | Schaaf |
| 7,288,044 B2 | 10/2007 | Gumpoltsberger |
| 7,335,126 B2 | 2/2008 | Tsuchiya et al. |
| 7,347,801 B2 | 3/2008 | Guenter et al. |
| 7,396,309 B2 | 7/2008 | Heitz et al. |
| 7,431,677 B2 | 10/2008 | Miller et al. |
| 7,470,210 B2 | 12/2008 | Miller et al. |
| 7,473,202 B2 | 1/2009 | Morscheck et al. |
| 7,485,069 B2 | 2/2009 | Jang et al. |
| 7,497,798 B2 | 3/2009 | Kim |
| 7,588,514 B2 | 9/2009 | McKenzie et al. |
| 7,637,838 B2 | 12/2009 | Gumpoltsberger |
| 7,672,770 B2 | 3/2010 | Inoue et al. |
| 7,686,729 B2 | 3/2010 | Miller et al. |
| 7,717,815 B2 | 5/2010 | Tenberge |
| 7,727,107 B2 | 6/2010 | Miller |
| 7,780,566 B2 | 8/2010 | Seo |
| 7,874,153 B2 | 1/2011 | Behm |
| 7,878,935 B2 | 2/2011 | Lahr |
| 7,951,035 B2 | 5/2011 | Platt |
| 7,980,972 B1 | 7/2011 | Starkey et al. |
| 8,029,401 B2 | 10/2011 | Johnson |
| 8,052,569 B2 | 11/2011 | Tabata et al. |
| 8,062,175 B2 | 11/2011 | Krueger et al. |
| 8,066,614 B2 | 11/2011 | Miller et al. |
| 8,142,323 B2 | 3/2012 | Tsuchiya et al. |
| 8,226,518 B2 | 7/2012 | Parraga |
| 8,257,216 B2 | 9/2012 | Hoffman |
| 8,257,217 B2 | 9/2012 | Hoffman |
| 8,287,414 B2 | 10/2012 | Weber et al. |
| 8,313,404 B2 | 11/2012 | Carter et al. |
| 8,382,636 B2 | 2/2013 | Shiina et al. |
| 8,545,368 B1 | 10/2013 | Davis et al. |
| 8,594,867 B2 | 11/2013 | Heap et al. |
| 8,639,419 B2 | 1/2014 | Roli et al. |
| 8,678,975 B2 | 3/2014 | Koike |
| 8,870,711 B2 | 10/2014 | Pohl et al. |
| 8,888,643 B2 | 11/2014 | Lohr et al. |
| 8,926,468 B2 | 1/2015 | Versteyhe et al. |
| 8,986,150 B2 | 3/2015 | Versteyhe et al. |
| 9,052,000 B2 | 6/2015 | Cooper |
| 9,114,799 B2 | 8/2015 | Tsukamoto et al. |
| 9,156,463 B2 | 10/2015 | Legner et al. |
| 2002/0004438 A1 | 1/2002 | Toukura et al. |
| 2002/0094911 A1 | 7/2002 | Haka |

(56) References Cited

U.S. PATENT DOCUMENTS

| | | |
|---|---|---|
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Joe et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0171452 A1 | 9/2004 | Miller et al. |
| 2005/0102082 A1 | 5/2005 | Joe et al. |
| 2005/0137046 A1 | 6/2005 | Miller et al. |
| 2005/0153810 A1 | 7/2005 | Miller et al. |
| 2007/0032327 A1 | 2/2007 | Raghavan et al. |
| 2007/0042856 A1 | 2/2007 | Greenwood et al. |
| 2007/0072732 A1 | 3/2007 | Klemen |
| 2007/0096556 A1 | 5/2007 | Kokubo et al. |
| 2007/0270270 A1 | 11/2007 | Miller et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0185201 A1 | 8/2008 | Bishop |
| 2009/0017959 A1 | 1/2009 | Triller |
| 2009/0062064 A1 | 3/2009 | Kamada et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093479 A1 | 4/2010 | Carter et al. |
| 2010/0106386 A1 | 4/2010 | Krasznai et al. |
| 2010/0113211 A1 | 5/2010 | Schneider et al. |
| 2010/0137094 A1 | 6/2010 | Pohl |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0230297 A1 | 9/2011 | Shiina et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0244990 A1 | 9/2012 | Ogawa et al. |
| 2012/0309579 A1 | 12/2012 | Miller et al. |
| 2013/0130859 A1 | 5/2013 | Lundberg et al. |
| 2013/0133965 A1 | 5/2013 | Books |
| 2013/0184115 A1 | 7/2013 | Urabe et al. |
| 2013/0190131 A1 | 7/2013 | Versteyhe et al. |
| 2013/0226416 A1 | 8/2013 | Seipold et al. |
| 2013/0303325 A1 | 11/2013 | Carey et al. |
| 2013/0304344 A1 | 11/2013 | Abe |
| 2014/0194243 A1 | 7/2014 | Versteyhe et al. |
| 2014/0274552 A1 | 9/2014 | Frink et al. |
| 2015/0024899 A1 | 1/2015 | Phillips |
| 2015/0111683 A1 | 4/2015 | Versteyhe et al. |
| 2015/0142281 A1 | 5/2015 | Versteyhe et al. |
| 2015/0159741 A1 | 6/2015 | Versteyhe et al. |
| 2015/0204429 A1 | 7/2015 | Versteyhe et al. |
| 2015/0204430 A1 | 7/2015 | Versteyhe |
| 2015/0226294 A1 | 8/2015 | Ziech et al. |
| 2015/0226298 A1 | 8/2015 | Versteyhe |
| 2015/0226299 A1 | 8/2015 | Cooper et al. |
| 2015/0252881 A1 | 9/2015 | Versteyhe |
| 2015/0354676 A1 | 12/2015 | Versteyhe et al. |

FOREIGN PATENT DOCUMENTS

| | | |
|---|---|---|
| DE | 1237380 * | 3/1967 |
| DE | 1237380 B | 3/1967 |
| DE | 3245045 A1 | 6/1984 |
| DE | 102005010751 A1 | 9/2006 |
| EP | 0156936 A1 | 10/1985 |
| EP | 0210053 A2 | 1/1987 |
| EP | 1061288 A2 | 12/2000 |
| EP | 2113056 B1 | 7/2012 |
| FR | 1030702 A | 6/1953 |
| FR | 1472282 A | 3/1967 |
| FR | 2280451 A1 | 2/1976 |
| FR | 2918433 A1 | 1/2009 |
| GB | 1127825 A | 9/1968 |
| GB | 2248895 A | 4/1992 |
| JP | H09119506 A | 5/1997 |
| JP | 2008180214 A | 8/2008 |
| JP | 2011153583 A | 8/2011 |
| WO | WO-2006002457 A1 | 1/2006 |
| WO | WO-2006041718 A2 | 4/2006 |
| WO | WO-2007046722 A1 | 4/2007 |
| WO | WO-2007051827 A1 | 5/2007 |
| WO | WO-2008103543 A1 | 8/2008 |
| WO | WO-2011011991 A1 | 2/2011 |
| WO | WO-2012008884 A1 | 1/2012 |
| WO | WO-2012177187 A1 | 12/2012 |
| WO | WO-2013109723 A1 | 7/2013 |
| WO | WO-2013123117 A1 | 8/2013 |
| WO | WO-2014039438 A2 | 3/2014 |
| WO | WO-2014039439 A1 | 3/2014 |
| WO | WO-2014039440 A1 | 3/2014 |
| WO | WO-2014039447 A1 | 3/2014 |
| WO | WO-2014039448 A2 | 3/2014 |
| WO | WO-2014039708 A1 | 3/2014 |
| WO | WO-2014039713 A1 | 3/2014 |
| WO | WO-2014039846 A2 | 3/2014 |
| WO | WO-2014039900 A1 | 3/2014 |
| WO | WO-2014039901 A1 | 3/2014 |
| WO | WO-2014078583 A1 | 5/2014 |
| WO | WO-2014124291 A1 | 8/2014 |
| WO | WO-2014151889 A2 | 9/2014 |
| WO | WO-2014159755 A2 | 10/2014 |
| WO | WO-2014159756 A2 | 10/2014 |
| WO | WO-2014165259 A1 | 10/2014 |
| WO | WO-2014179717 A1 | 11/2014 |
| WO | WO-2014179719 A1 | 11/2014 |
| WO | WO-2014186732 A1 | 11/2014 |
| WO | WO-2014197711 A1 | 12/2014 |
| WO | WO-2015059601 A1 | 4/2015 |
| WO | WO-2015073883 A1 | 5/2015 |
| WO | WO-2015073887 A1 | 5/2015 |
| WO | WO-2015073948 A2 | 5/2015 |

OTHER PUBLICATIONS

PCT/US2014/025001 International Preliminary Report on Patentability dated Sep. 24, 2015.
PCT/US2014/026619 International Preliminary Report on Patentability dated Sep. 24, 2015.
PCT/US2014/25004 International Preliminary Report on Patentability dated Oct. 1, 2015.
PCT/US2015/37916 International Search Report and Written Opinion dated Sep. 29, 2015.
U.S. Appl. No. 14/175,584 Office Action dated Apr. 2, 2015.
U.S. Appl. No. 14/426,139 Office Action dated Oct. 6, 2015.
U.S. Appl. No. 60/616,399, filed on Oct. 5, 2004.
International Search Report with Written Opinion for PCT/US2014/015352.
Co-pending U.S. Appl. No. 14/925,813, filed Oct. 28, 2015.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
Moore et al. A Three Revolute Cobot Using CVTs in Parallel, Proceedings of IMECE, 1999, 6 pgs.
PCT/US2013/021890 International Preliminary Report on Patentability dated Jul. 31, 2014.

(56) References Cited

OTHER PUBLICATIONS

PCT/US2013/021890 International Search Report dated Apr. 10, 2013.
PCT/US2013/026037 International Preliminary Report on Patentability dated Aug. 28, 2014.
PCT/US2013/026037 International Search Report dated Jul. 15, 2013.
PCT/US2013/057837 International Preliminary Report on Patentability dated Mar. 19, 2015.
PCT/US2013/057837 International Search Report and Written Opinion dated Mar. 31, 2014.
PCT/US2013/057838 International Preliminary Report on Patentability dated Mar. 19, 2015.
PCT/US2013/057838 International Search Report and Written Opinion dated Jan. 17, 2014.
PCT/US2013/057839 International Preliminary Report on Patentability dated Mar. 19, 2015.
PCT/US2013/057839 International Search Report and Written Opinion dated Feb. 6, 2014.
PCT/US2013/057866 International Preliminary Report on Patentability dated Mar. 19, 2015.
PCT/US2013/057866 International Search Report dated Feb. 11, 2014.
PCT/US2013/057868 International Preliminary Report on Patentability dated Mar. 19, 2015.
PCT/US2013/057868 International Search Report and Written Opinion dated Apr. 9, 2014.
PCT/US2013/058309 International Preliminary Report on Patentability dated Mar. 19, 2015.
PCT/US2013/058309 International Search Report and Written Opinion dated Feb. 11, 2014.
PCT/US2013/058318 International Preliminary Report on Patentability dated Mar. 19, 2015.
PCT/US2013/058318 International Search Report and Written Opinion dated Feb. 11, 2014.
PCT/US2013/058545 International Preliminary Report on Patentability dated Mar. 19, 2015.
PCT/US2013/058545 International Search Report and Written Opinion dated Feb. 19, 2014.
PCT/US2013/058615 International Preliminary Report on Patentability dated Mar. 19, 2015.
PCT/US2013/058615 International Search Report and Written Opinion dated Feb. 11, 2014.
PCT/US2013/058616 International Preliminary Report on Patentability dated Mar. 19, 2015.
PCT/US2013/058616 International Search Report and Written Opinion dated Feb. 11, 2014.
PCT/US2013/070177 International Preliminary Report on Patentability dated May 28, 2015.
PCT/US2013/070177 International Search Report and Written Opinion dated Apr. 14, 2014.
PCT/US2014/025001 International Search Report and Written Opinion dated Jul. 14, 2014.
PCT/US2014/025004 International Search Report and Written Opinion dated Jul. 14, 2014.
PCT/US2014/025005 International Preliminary Report on Patentability dated Oct. 1, 2015.
PCT/US2014/025005 International Search Report and Written Opinion dated Jul. 14, 2014.
PCT/US2014/026619 International Search Report and Written Opinion dated Sep. 9, 2014.
PCT/US2014/036621 International Search Report and Written Opinion dated Sep. 4, 2014.
PCT/US2014/036623 International Search Report and Written Opinion dated Sep. 4, 2014.
PCT/US2014/038439 International Search Report and Written Opinion dated Sep. 30, 2014.
PCT/US2014/041124 International Search Report and Written Opinion dated Oct. 15, 2014.
PCT/US2014/065792 International Search Report and Written Opinion dated Apr. 9, 2015.
PCT/US2014/065796 International Search Report and Written Opinion dated Apr. 9, 2015.
PCT/US2014/065909 International Search Report and Written Opinion dated Feb. 19, 2015.
U.S. Appl. No. 13/743,951 Office Action dated Aug. 19, 2015.
U.S. Appl. No. 13/743,951 Office Action dated Mar. 18, 2015.
U.S. Appl. No. 14/017,054 Office Action dated Aug. 27, 2014.
U.S. Appl. No. 14/017,054 Office Action dated Dec. 12, 2014.
U.S. Appl. No. 61/819,414, filed May 3, 2013.
Wong. The Temple of VTEC Asia Special Focus on the Multimatic Transmission. Temple of VTEC Asia. 2000.
PCT/US2014/038439 International Preliminary Report on Patentability dated Nov. 26, 2015.
PCT/US2014/041124 International Preliminary Report on Patentability dated Dec. 17, 2015.
PCT/US2014/065909 Written Opinion dated Dec. 11, 2015.
PCT/US2015/36170 International Search Report and Written Opinion dated Dec. 17, 2015.
U.S. Appl. No. 13/743,951 Office Action dated Jan. 21, 2016.
PCT/US2014/036621 International Preliminary Report on Patentability dated Nov. 12, 2015.
PCT/US2014/036623 International Preliminary Report on Patentability dated Nov. 12, 2015.
PCT/US2014/065796 International Preliminary Report on Patentability dated Nov. 6, 2015.
U.S. Appl. No. 14/210,130 Office Action dated Nov. 20, 2015.
U.S. Appl. No. 14/542,336 Office Action dated Nov. 25, 2015.
PCT/US2015/64087 International Search Report and Written Opinion dated Feb. 11, 2016.
Co-pending U.S. Appl. No. 15/067,427, filed on Mar. 11, 2016.
Co-pending U.S. Appl. No. 15/067,752, filed on Mar. 11, 2016.
U.S. Appl. No. 14/378,750 Office Action dated Apr. 8, 2016.

* cited by examiner

US 9,404,414 B2

INTERNAL COMBUSTION ENGINE COUPLED TURBOCHARGER WITH AN INFINITELY VARIABLE TRANSMISSION

CLAIM OF PRIORITY

The present application claims the benefit of priority to U.S. Provisional Application No. 61/762,379 filed on Feb. 8, 2013, which is incorporated herein in its entirety by reference.

FIELD OF THE INVENTION

The present invention relates to energy recovery systems and more specifically to waste heat recovery systems used with internal combustions engines.

BACKGROUND OF THE INVENTION

In conventional reciprocating piston engines, ambient air is typically pulled inside an engine cylinder during an intake (or induction) stroke of a piston. The volumetric efficiency, which is the amount of air inducted into the engine cylinder by the piston divided by the cylinder volume, is limited both by the atmospheric pressure and the change in pressure needed to bring air into the cylinder. Increasing the volumetric efficiency reduces relative engine losses, increases engine efficiency, and also increase the power output of the engine without increasing a displacement of the engine. A related common trend is engine downsizing, which means a size of the engine is reduced in order to decrease engine losses significantly, while maintaining about the same amount of power output from the engine.

In order to improve the volumetric efficiency of naturally aspirated engines, two forced induction devices may be typically used; a turbocharger or a supercharger. A supercharger typically comprises a compressor in driving engagement with an engine crankshaft to compress additional air before intake into the engine. Superchargers will not be discussed in detail herein as they do not recuperate the kinetic energy from an exhaust gas flow; instead superchargers increase the power of the engine by increasing the volumetric efficiency of the engine.

FIG. 1 shows a cut-through sketch of a turbocharger 100 known in the prior art. A turbine 102, which is a radial inflow turbine expander, is shown which has an intake port 104 where the exhaust gas flow enters the turbine 102 radially and leaves through an outlet port 106 axially. A plurality of blades 108 of the turbine 102 allow for a recuperation of kinetic energy from the exhaust gas flow, which is directed to a central rotor hub 110. The central rotor hub 110 is also drivingly engaged with a compressor 112, in which a flow of air enters an intake port 114 axially and is pushed radially to an outlet port 116 by a plurality of blades 118 of the compressor 112. Due to inherent limitations in the design, the turbocharger 100 is subject to several issues that may be solved by using a complex control methodology or through the addition of costly technologies to the turbocharger 100.

One issue associated with such a turbocharger is a maximum boost pressure that the engine can withstand without damage to components of the engine due to increased pressure. Further, knocking of the engine may damage the turbocharger. A boost pressure increases depending on am amount of exhaust gases, as the compressor is directly linked to the turbine. At a certain point, pressure has to be limited to avoid engine knocking and other potential damage related to the increased pressure at an intake manifold of the engine. This issue is commonly corrected through the use of a wastegate. The wastegate diverts a portion of the exhaust gas from the turbine, thus limiting the pressure and amount of energy that can be recuperated by the turbine. In a conventional configuration of a turbocharger, the excessive wasted exhaust and the complex control of the wastegate cannot be avoided.

Another issue associated with such a turbocharger issue is a dynamic known as turbo lag. Turbo lag is a time required to adjust a power output of the turbocharger in response to an adjustment in a throttle of the vehicle. Turbo lag is caused by an amount of time needed to generate a required pressure boost by an exhaust system and the turbine. Turbo lag significantly depends on the inertia of the components of the turbocharger, an amount of friction within the turbocharger, and an initial speed of the turbocharger, and an amount of exhaust gas passing through the turbine. A number of ways exist to decrease the turbo lag. For example, it is possible to decrease the rotational inertia, to change the aspect ratio of the turbine, to use variable geometry components, amongst other improvement, but all improvements significantly affect a cost and complexity of the turbocharger.

Another issue associated with such a turbocharger is a boost threshold. Turbochargers start producing boost only when enough energy can be recuperated by the turbine. Without the required amount of kinetic energy, the turbocharger will not be able to provide the required amount of boost. An engine speed at which this limitation disappears is called a boost threshold speed. The boost threshold speed is dependent on an engine size and an operating speed of the engine, a throttle opening, and a design of the turbocharger. As a result of the boot threshold, an operator of a vehicle including the turbocharger may notice an ineffectiveness of the turbocharger when the engine is operated under a certain speed.

A final issue associated with such a turbocharger is based on an energy recuperation capability of the turbocharger. The turbine of the turbocharger is only able to recuperate energy from the exhaust gas flow to compress intake gases. If the operator of the vehicle requests a low amount of power output from the engine, compression of the intake gases is not necessary, and all of the kinetic energy in the exhaust gas flow is directed around the turbine using the wastegate. Directing the exhaust gas flow around the turbine using the wastegate is an inefficient manner of operation for the turbocharger.

It would be advantageous to develop a turbocharger for an internal combustion engine that is simply controlled, reduces turbo lag, decreases a boost threshold of the turbocharger, and increases an efficiency of the internal combustion engine.

SUMMARY OF THE INVENTION

Presently provided by the invention, a turbocharger for an internal combustion engine that is simply controlled, reduces turbo lag, decreases a boost threshold of the turbocharger, and increases an efficiency of the internal combustion engine, has surprisingly been discovered.

In one embodiment, the present invention is directed to a turbocharger for an internal combustion engine. The turbocharger comprises a differential device having a carrier portion, a compressor portion, and a turbine portion. The compressor portion is in driving engagement with a first portion of the differential device. The turbine portion is in driving engagement with a second portion of the differential device. The carrier portion of the differential device is in driving engagement with an infinitely variable transmission. The infinitely variable transmission is in driving engagement with the internal combustion engine.

In another embodiment, the present invention is directed to a turbocharger for an internal combustion engine. The turbocharger comprises a differential device having a carrier portion, a compressor portion, a turbine portion, and an output shaft. The compressor portion is in driving engagement with a first portion of the differential device. The turbine portion is in driving engagement with a second portion of the differential device. The output shaft is in driving engagement with the carrier portion of the differential device and a ratio adjusting device. The ratio adjusting device is in further engagement with an infinitely variable transmission. The infinitely variable transmission is in driving engagement with the internal combustion engine.

In yet another embodiment, the present invention is directed to a turbocharger for an internal combustion engine. The turbocharger comprises a differential device having a carrier portion, a compressor portion, a turbine portion, a first ratio adjusting device, and an output shaft. The compressor portion is in driving engagement with a first portion of the differential device. The turbine portion is in driving engagement with a second portion of the differential device. A first ratio adjusting device is in driving engagement with at least one of the compressor portion and the first portion of the differential device and the turbine portion and the second portion of the differential device. The output shaft is in driving engagement with the carrier portion of the differential device and a second ratio adjusting device. The second ratio adjusting device is in further engagement with an infinitely variable transmission. The infinitely variable transmission is in driving engagement with the internal combustion engine.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
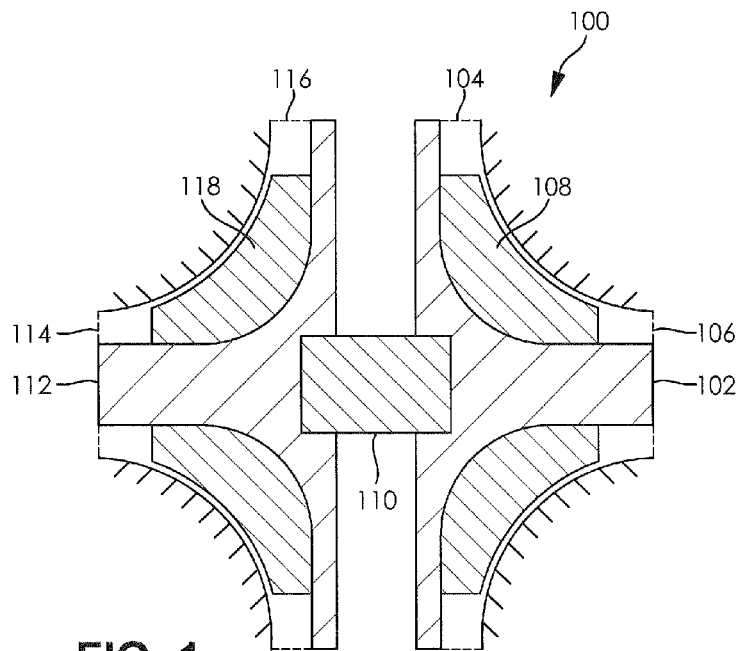
FIG. 1 is a schematic illustration of a cut away side view of a turbocharger known in the prior art.
Figure 2:
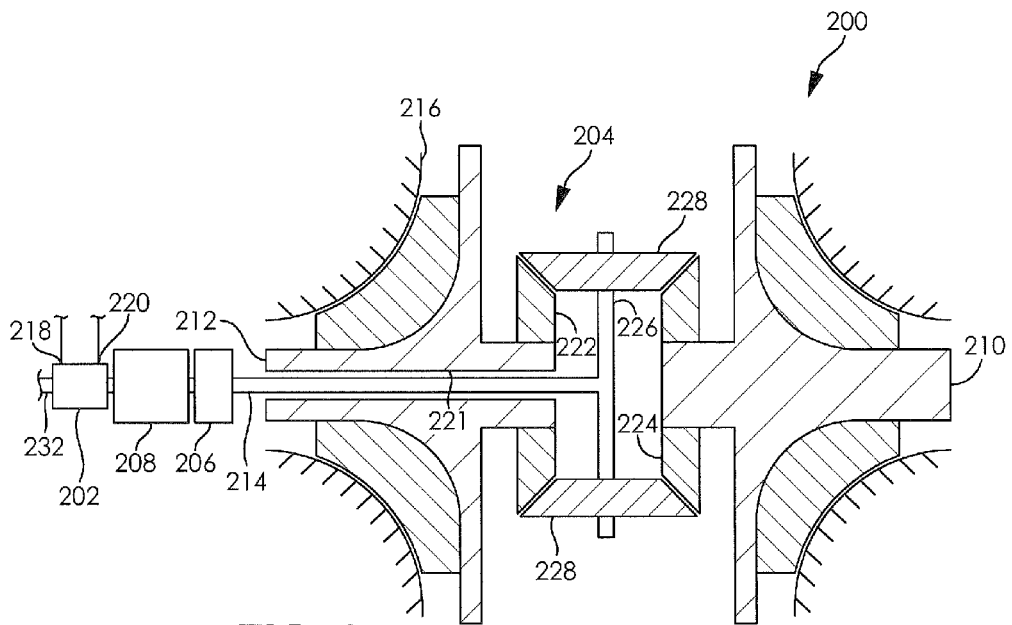
FIG. 2 is a schematic illustration of a cut away side view of an embodiment of a turbocharger according to the present invention, the turbocharger in driving engagement with a ratio adjusting device, an infinitely variable transmission, and an internal combustion engine.

FIG. 2 schematically illustrates a turbocharger 200 for use with an internal combustion engine 202. The turbocharger 200 is in driving engagement and fluid communication with the internal combustion engine 202. The turbocharger 200 is in driving engagement with the internal combustion engine 202 through a differential device 204, a ratio adjusting device 206, and an infinitely variable transmission 208. Typically, the internal combustion engine 202 is used as a power source for a vehicle (not shown); however, it is understood that the internal combustion engine 202 may be used in other applications, such as in stationary power generation applications.

The turbocharger 200 includes a turbine portion 210, a compressor portion 212, the differential device 204, and an output shaft 214. The turbine portion 210, the compressor portion 212, the differential device 204, and the output shaft 214 are rotatably mounted within a housing 216 using a plurality of bearings (not shown). The turbine portion 210 and the compressor portion 212 are drivingly engaged with the output shaft 214 through the differential device 204. As is known in the art, the turbine portion 210 is driven by exhaust gases via an exhaust port 218 of the internal combustion engine 202. The turbine portion 210 is drivingly engaged with the compressor portion 212 through the differential device 204 to provide compressed air to an intake port 220 of the internal combustion engine 202. The output shaft 214 is also drivingly engaged with the internal combustion engine 202 through the ratio adjusting device 206 and the infinitely variable transmission 208; however, it is understood that the turbine portion 210 and the compressor portion 212 may be drivingly engaged internal combustion engine 202 in another manner that facilitates infinitely variable driving engagement therebetween. As shown in FIG. 2, the output shaft 214 passes through a central perforation 221 formed through the compressor portion 212; however, it is understood that the output shaft 214 may pass through the turbine portion 210 or that the output shaft 214 may be drivingly engaged with the internal combustion engine 202 in another manner.

The differential device 204 comprises a first side gear 222, a second side gear 224, a differential carrier 226, and a plurality of spider gears 228. The first side gear 222, the second side gear 224, the differential carrier 226, and the plurality of spider gears 228 are disposed within the housing 216, between the turbine portion 210 and the compressor portion 212. The first side gear 222 and the second side gear 224 are bevel gears respectively disposed on and splinngly engaged with the compressor portion 212 and the turbine portion 210. Alternately, it is understood that the first side gear 222 and the second side gear 224 may be integrally formed with the compressor portion 212 and the turbine portion 210, respectively. The differential carrier 226 is a member in driving engagement with the output shaft 214 on which the plurality of spider gears 228 are rotatingly disposed. The plurality of spider gears 228 are bevel gears each in driving engagement with the first side gear 222 and the second side gear 224 and facilitate a differential action therebetween. so FIG. 2 illustrates the differential device 204 having two spider gears 228; however, it is understood that the differential device 204 may include three or more spider gears 228. It is also understood that it is within the scope of the invention for the turbocharger 200 to be adapted to include a planetary style differential, instead of the bevel gear style differential shown in FIG. 2.

The internal combustion engine 202 comprises at least an engine block (not shown) and an engine output 232; however, it is understood that the internal combustion engine 202 will typically include other components, such as a plurality of valves, a plurality of pistons, at least one crankshaft, a plurality of connecting rods, a clutching device, a fuel delivery system, an ignition system, and a cooling system. The internal combustion engine 202 is in fluid communication with the turbocharger 200 through the intake port 220 and the exhaust port 218. The internal combustion engine 202 is in driving engagement with the output shaft 214 through the infinitely variable transmission 208 and the ratio adjusting device 206. The internal combustion engine 202 may be any type of internal combustion engine which may be fitted with a turbocharger.

The ratio adjusting device 206 is a drive ratio adjusting device in driving engagement with the output shaft 214 and the infinitely variable transmission 208. The ratio adjusting device 206 is a fixed ratio device which adjusts a drive ratio between the output shaft 214 and the infinitely variable transmission 208. As a non-limiting example, the ratio adjusting device 206 may comprise a plurality of gears drivingly engaged with one another. FIG. 2 illustrates the ratio adjusting device 206 disposed about a portion of the output shaft 214; however, it is understood that the ratio adjusting device 206 may be arranged in another manner, such as through a gear, a belt, or a power take off, for example.

The infinitely variable transmission 208 is a drive ratio adjusting device that is in driving engagement with the ratio adjusting device 206 and the internal combustion engine 202. The infinitely variable transmission 208 may be placed in an infinite number of drive ratios to facilitate driving engagement between the ratio adjusting device 206 and the internal combustion engine 202. It is understood that the infinitely variable transmission 208 may be placed in a positive drive ratio, a negative drive ratio, and a zero drive ratio. The infinitely variable transmission 208 may include a clutching device (not shown) for drivingly disengaging the internal combustion engine 202 from the turbocharger 200. As a non-limiting example, the infinitely variable transmission 208 may be a tilting ball style infinitely variable transmission or another type of infinitely variable transmission. FIG. 2 illustrates the infinitely variable transmission 208 disposed about a portion of the output shaft 214; however, it is understood that the infinitely variable transmission 208 may be arranged in another manner, such as through a gear, a belt, or a power take off, for example. It is also understood that it is within the scope of the invention for the infinitely variable transmission 208 to be substituted with an electric motor (not shown), the electric motor in electrical communication with a control system (not shown) of a vehicle incorporating the turbocharger 200.

Figure 3:
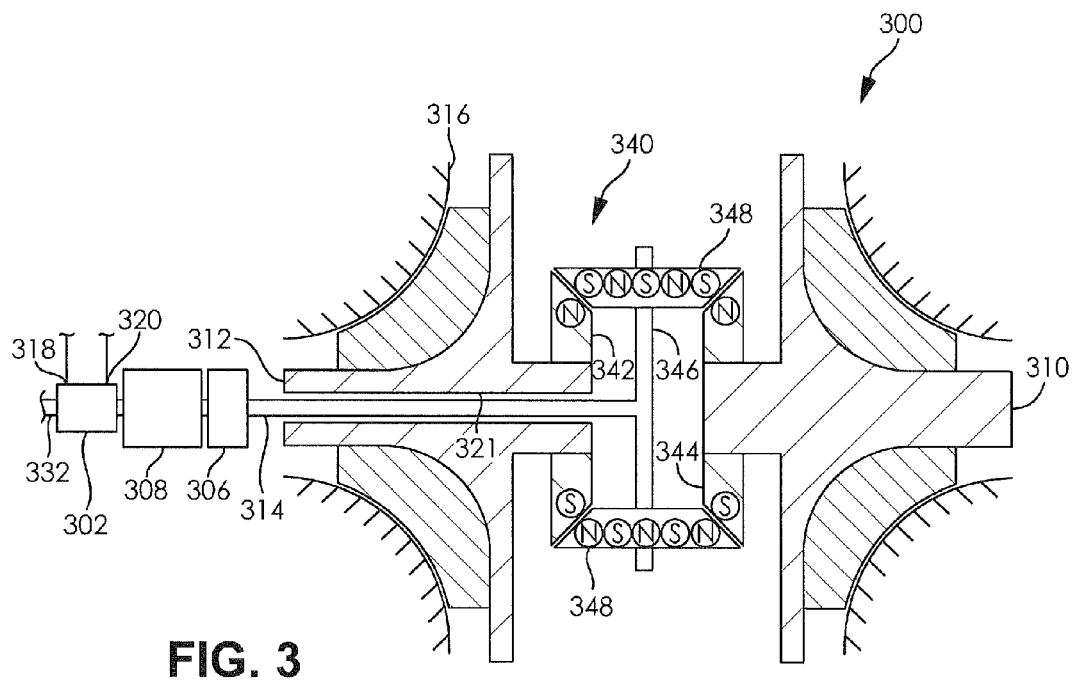
FIG. 3 is a schematic illustration of a cut away side view of an embodiment of a turbocharger according to another embodiment of the present invention, the turbocharger in driving engagement with a ratio adjusting device, an infinitely variable transmission, and an internal combustion engine.

FIG. 3 schematically illustrates a turbocharger 300 for use with an internal combustion engine 302 according to another embodiment of the invention. The embodiment shown in FIG. 3 includes similar components to the turbocharger 200 for use with the internal combustion engine 202 illustrated in FIG. 2. Similar features of the embodiment shown in FIG. 3 are numbered similarly in series, with the exception of the features described below.

FIG. 3 schematically illustrates the turbocharger 300 for use with an internal combustion engine 302. The turbocharger 300 is in driving engagement and fluid communication with the internal combustion engine 302. The turbocharger 300 is in driving engagement with the internal combustion engine 302 through a differential device 340, a ratio adjusting device 306, and an infinitely variable transmission 308. Typically, the internal combustion engine 302 is used as a power source for a vehicle (not shown); however, it is understood that the internal combustion engine 302 may be used in other applications, such as in stationary power generation applications.

The differential device 340 comprises a first side gear 342, a second side gear 344, a differential carrier 346, and a plurality of spider gears 348. The first side gear 342, the second side gear 344, the differential carrier 346, and the plurality of spider gears 348 are disposed within the housing 316, between the turbine portion 310 and the compressor portion 312.

The first side gear 342 and the second side gear 344 are magnetic bevel gears respectively disposed on and spliningly engaged with the compressor portion 312 and the turbine portion 310. Each of the side gears 342, 344 comprise a plurality of magnets arranged in a circular pattern in a face of the side gears 342, 344. A polarity of alternating magnets is reversed for magnetically engaging each of the plurality of spider gears 348. Alternately, it is understood that the first side gear 342 and the second side gear 344 may be integrally formed with the compressor portion 312 and the turbine portion 310, respectively.

The differential carrier 346 is a member in driving engagement with the output shaft 314 on which the plurality of spider gears 348 are rotatingly disposed.

The plurality of spider gears 348 are magnetic bevel gears each in magnetic engagement with the first side gear 342 and the second side gear 344 and facilitate a differential action therebetween. Each of the spider gears 348 comprise a plurality of magnets arranged in a circular pattern in a face of the gears 348. A polarity of alternating magnets is reversed for magnetically engaging each of the side gears 342, 344. FIG. 3 illustrates the differential device 340 having two spider gears 328; however, it is understood that the differential device 340 may include three or more spider gears 348.

Figure 4:
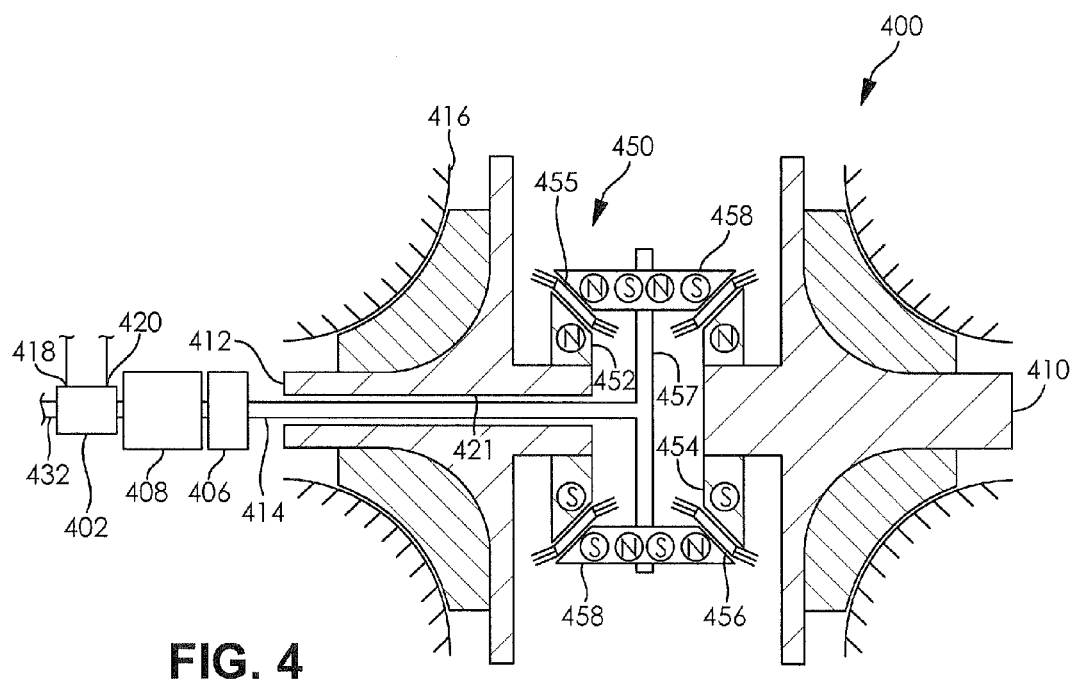
FIG. 4 is a schematic illustration of a cut away side view of an embodiment of a turbocharger according to another embodiment of the present invention, the turbocharger in driving engagement with a ratio adjusting device, an infinitely variable transmission, and an internal combustion engine.

FIG. 4 schematically illustrates a turbocharger 400 for use with an internal combustion engine 402 according to another embodiment of the invention. The embodiment shown in FIG. 4 includes similar components to the turbocharger 200 for use with the internal combustion engine 202 illustrated in FIG. 2. Similar features of the embodiment shown in FIG. 4 are numbered similarly in series, with the exception of the features described below.

FIG. 4 schematically illustrates the turbocharger 400 for use with an internal combustion engine 402. The turbocharger 400 is in driving engagement and fluid communication with the internal combustion engine 402. The turbocharger 400 is in driving engagement with the internal combustion engine 402 through a differential device 450, a ratio adjusting device 406, and an infinitely variable transmission 408. Typically, the internal combustion engine 402 is used as a power source for a vehicle (not shown); however, it is understood that the internal combustion engine 402 may be used in other applications, such as in stationary power generation applications.

The differential device 450 comprises a first side gear 452, a second side gear 454, a first intermediate ferrite member 455, a second intermediate ferrite member 456, a differential carrier 457, and a plurality of spider gears 458. The first side gear 452, the second side gear 454, the first intermediate ferrite member 455, the second intermediate ferrite member 456, the differential carrier 457, and the plurality of spider gears 458 are disposed within the housing 416, between the turbine portion 410 and the compressor portion 412.

The first side gear 452 and the second side gear 454 are magnetic bevel gears respectively disposed on and spliningly engaged with the compressor portion 412 and the turbine portion 410. Each of the side gears 452, 454 comprise a plurality of magnets arranged in a circular pattern in a face of the side gears 452, 454. A polarity of alternating magnets is reversed for magnetically engaging each of the plurality of spider gears 458 through the intermediate ferrite members 455, 456. Alternately, it is understood that the first side gear 452 and the second side gear 454 may be integrally formed with the compressor portion 412 and the turbine portion 410, respectively.

The first intermediate ferrite member 455 is a member disposed between the first side gear 452 and the plurality of spider gears 458. The first intermediate ferrite member 455 is formed from a ferrous material and facilitates in a transfer of the magnetic field between the first side gear 452 and the plurality of spider gears 458.

The second intermediate ferrite member 456 is a member disposed between the second side gear 454 and the plurality of spider gears 458. The second intermediate ferrite member 456 is formed from a ferrous material and facilitates in a transfer of the magnetic field between the second side gear 454 and the plurality of spider gears 458.

The differential carrier 457 is a member in driving engagement with the output shaft 414 on which the plurality of spider gears 458 are rotatingly disposed.

The plurality of spider gears 458 are magnetic bevel gears each in magnetic engagement with the first side gear 452 and the second side gear 454 through the intermediate ferrite members 455, 456 and facilitate a differential action between the first side gear 452 and the second side gear 454. Each of the spider gears 458 comprise a plurality of magnets arranged in a circular pattern in a face of the gears 458. A polarity of alternating magnets is reversed for magnetically engaging each of the side gears 452, 454 through the intermediate ferrite members 455, 456. FIG. 4 illustrates the differential device 450 having two spider gears 458; however, it is understood that the differential device 450 may include three or more spider gears 458.

Figure 5:
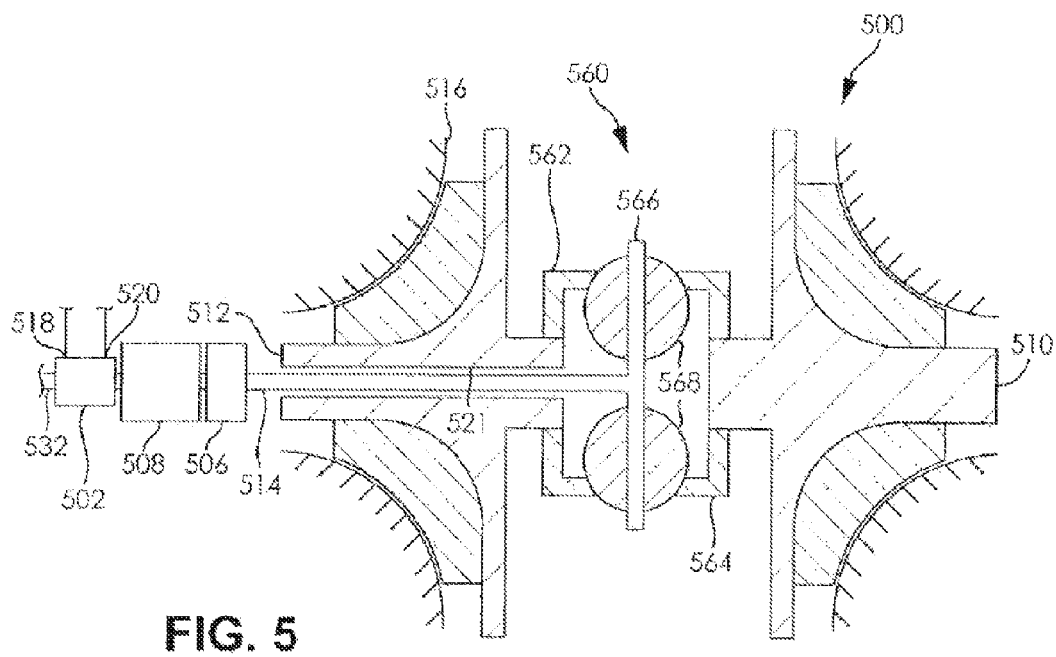
FIG. 5 is a schematic illustration of a cut away side view of an embodiment of a turbocharger according to another embodiment of the present invention, the turbocharger in driving engagement with a ratio adjusting device, an infinitely variable transmission, and an internal combustion engine.

FIG. 5 schematically illustrates a turbocharger 500 for use with an internal combustion engine 502 according to another embodiment of the invention. The embodiment shown in FIG. 5 includes similar components to the turbocharger 200 for use with the internal combustion engine 202 illustrated in FIG. 2. Similar features of the embodiment shown in FIG. 5 are numbered similarly in series, with the exception of the features described below.

FIG. 5 schematically illustrates the turbocharger 500 for use with an internal combustion engine 502. The turbocharger 500 is in driving engagement and fluid communication with the internal combustion engine 502. The turbocharger 500 is in driving engagement with the internal combustion engine 502 through a differential device 560, a ratio adjusting device 506, and an infinitely variable transmission 508. Typically, the internal combustion engine 502 is used as a power source for a vehicle (not shown); however, it is understood that the internal combustion engine 502 may be used in other applications, such as in stationary power generation applications.

The differential device 560 comprises a first drive ring 562, a second drive ring 564, a ball carrier 566, and a plurality of balls 568. The first drive ring 562, the second drive ring 564, the ball carrier 566, and the plurality of balls 568 are disposed within the housing 516, between the turbine portion 510 and the compressor portion 512.

The first drive ring 562 is an annular member formed from a metal. The first drive ring 562 is disposed on and splinimly engaged with the compressor portion 512. A portion of an outer surface of the first drive ring 562 is configured to contact a portion of each of the plurality of balls 568. The portion of each of the plurality of balls 568 is in driving engagement with the first drive ring 562 through one of a boundary layer type friction and an elastohydrodynamic film. Such driving engagement affords a transfer of torque without slipping. At least a portion of the housing 516 is filled with a shear thickening fluid to facilitate the driving engagement with the first drive ring 562 and the plurality of balls 568.

The second drive ring 564 is an annular member formed from a metal. The second drive ring 564 is disposed on and splinimly engaged with the turbine portion 510. A portion of an outer surface of the second drive ring 564 is configured to contact a portion of each of the plurality of balls 568. The portion of each of the plurality of balls 568 is in driving engagement with the second drive ring 564 through one of a boundary layer type friction and an elastohydrodynamic film. As mentioned hereinabove, at least a portion of the housing 516 is filled with the shear thickening fluid to facilitate the driving engagement with the second drive ring 564 and the plurality of balls 568.

The ball carrier 566 is a member in driving engagement with the output shaft 514. The ball carrier includes a plurality of axes 569 in a radially arrangement onto which the plurality of balls 568 are rotatingly disposed.

The plurality of balls 568 are metal spheres in driving engagement with the first drive ring 562 and the second drive ring 564 through the shear thickening fluid. The plurality of balls 568 facilitates a differential action between the first drive ring 562 and the second drive ring 564, when the balls 568 rotate about the plurality of axes 569. The differential device 560 may include three or more balls 568.

Figure 6:
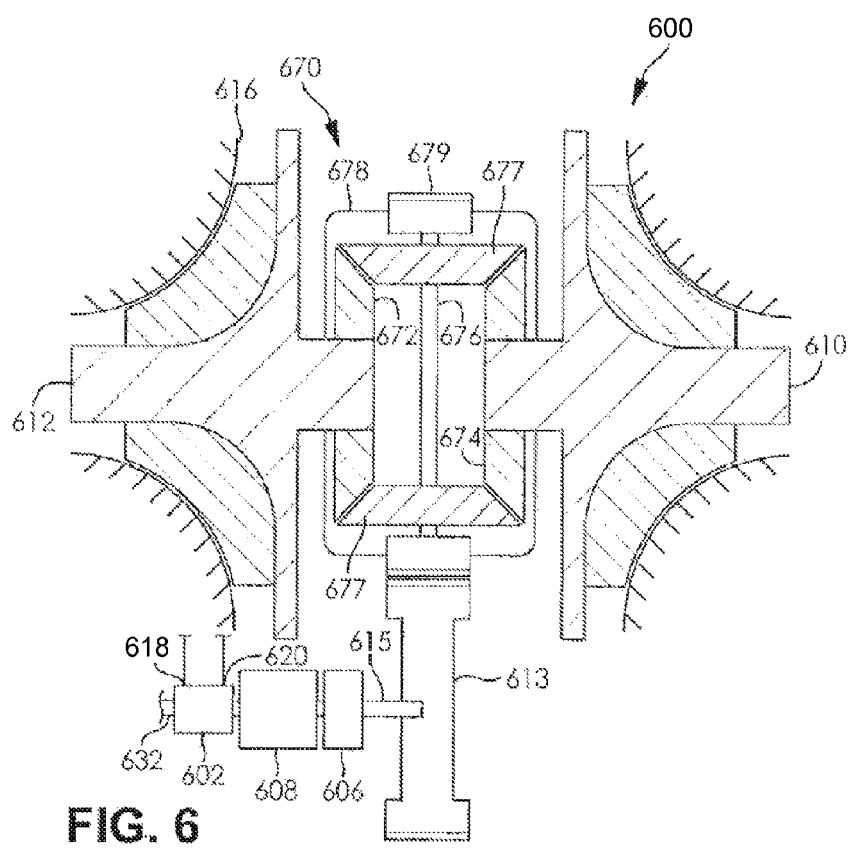
FIG. 6 is a schematic illustration of a cut away side view of an embodiment of a turbocharger according to another embodiment of the present invention, the turbocharger in driving engagement with a ratio adjusting device, an infinitely variable transmission, and an internal combustion engine.

FIG. 6 schematically illustrates a turbocharger 600 for use with an internal combustion engine 602 according to another embodiment of the invention. The embodiment shown in FIG. 6 includes similar components to the turbocharger 200 for use with the internal combustion engine 202 illustrated in FIG. 2. Similar features of the embodiment shown in FIG. 6 are numbered similarly in series, with the exception of the features described below.

FIG. 6 schematically illustrates the turbocharger 600 for use with an internal combustion engine 602. The turbocharger 600 is in driving engagement and fluid communication with the internal combustion engine 602. The turbocharger 600 is in driving engagement with the internal combustion engine 602 through a differential device 670, a ratio adjusting device 606, and an infinitely variable transmission 608. Typically, the internal combustion engine 602 is used as a power source for a vehicle (not shown); however, it is understood that the internal combustion engine 602 may be used in other applications, such as in stationary power generation applications.

The turbocharger 600 includes a turbine portion 610, a compressor portion 612, the differential device 670, an output gear 613, and an output shaft 615. The turbine portion 610, the compressor portion 612, the differential device 670, the output gear 613, and the output shaft 615 are rotatably mounted within a housing 616 using a plurality of bearings (not shown). The turbine portion 610 and the compressor portion 612 are drivingly engaged with the output shaft 615 through the differential device 670 and the output gear 613. As is known in the art, the turbine portion 610 is driven by exhaust gases via an exhaust port 618 of the internal combustion engine 602. The turbine portion 610 is drivingly engaged with the compressor portion 612 through the differential device 670 to provide compressed air to an intake port 620 of the internal combustion engine 602. The output shaft 615 is also drivingly engaged with the internal combustion engine 602 through the ratio adjusting device 606 and the infinitely variable transmission 608; however, it is understood that the turbine portion 610 and the compressor portion 612 may be drivingly engaged internal combustion engine 602 in another manner that facilitates infinitely variable driving engagement therebetween.

The differential device 670 comprises a first side gear 672, a second side gear 674, a differential carrier 676, a plurality of spider gears 677, and a differential housing 678. The first side gear 672, the second side gear 674, the differential carrier 676, and the plurality of spider gears 677 are disposed within the differential housing 678, which is rotatably disposed between the turbine portion 610 and the compressor portion 612. The first side gear 672 and the second side gear 674 are bevel gears respectively disposed on and spliningly engaged with the compressor portion 612 and the turbine portion 610. Alternately, it is understood that the first side gear 672 and the second side gear 674 may be integrally formed with the compressor portion 612 and the turbine portion 610, respectively. The differential carrier 676 is a member in driving engagement with the differential housing 678. The plurality of spider gears 677 is rotatingly disposed on the differential carrier 676. The plurality of spider gears 677 are bevel gears each in driving engagement with the first side gear 672 and the second side gear 674 and facilitate a differential action therebetween. FIG. 6 illustrates the differential device 670 having two spider gears 677; however, it is understood that the differential device 670 may include three or more spider gears 677.

The differential housing 678 is a hollow member into which the first side gear 672, the second side gear 674, the differential carrier 676, and the plurality of spider gears 677 are disposed. An outer surface of the differential housing 678 includes a ring gear 679 coupled thereto. Alternately, it is understood that the ring gear 679 may be integrally formed with the differential housing 678. The ring gear 679 is in driving engagement with the output gear 613.

The output gear 613 is drivingly engaged with the ring gear 679 and the output shaft 615. The output gear 613 is rotatably disposed in the housing 616 and supported by bearings (not shown).

The output shaft 615 is a member drivingly engaged with the internal combustion engine 602 and the output gear 613. The output shaft 615 is drivingly engaged with the internal combustion engine 602 through the ratio adjusting device 606 and the infinitely variable transmission 608.

Figure 7:
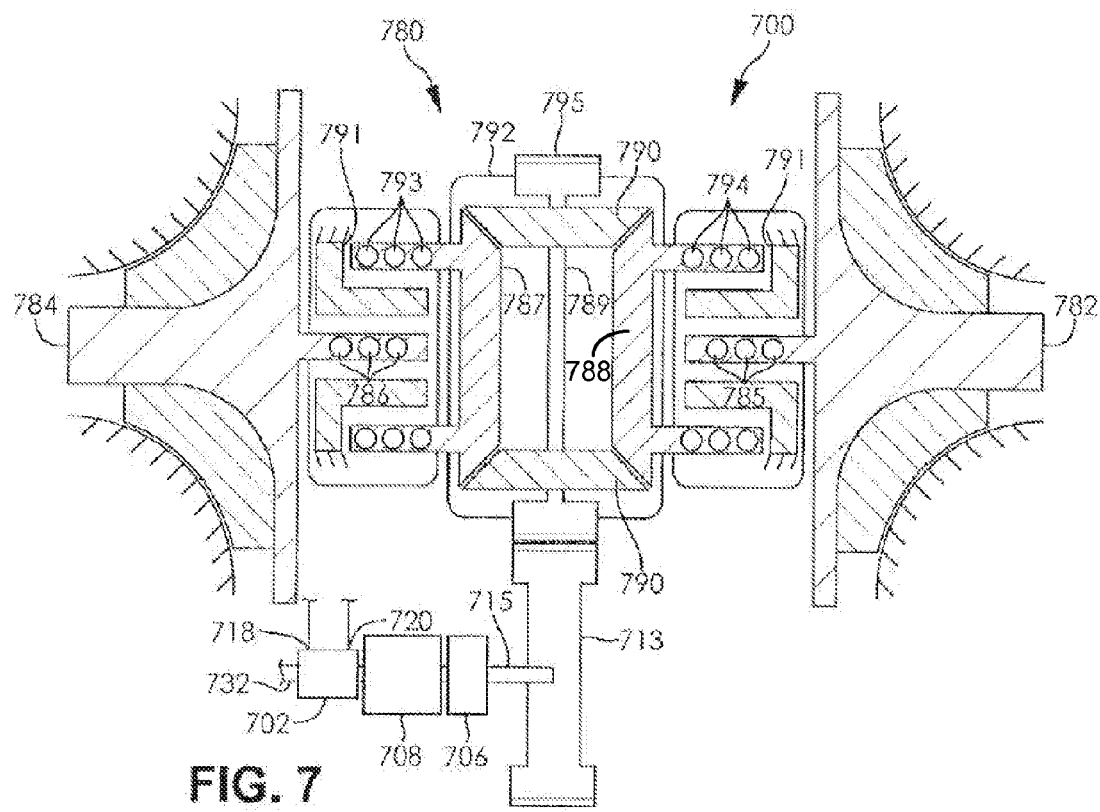
FIG. 7 is a schematic illustration of a cut away side view of an embodiment of a turbocharger according to another embodiment of the present invention, the turbocharger in driving engagement with a ratio adjusting device, an infinitely variable transmission, and an internal combustion engine.

FIG. 7 schematically illustrates a turbocharger 700 for use with an internal combustion engine 702 according to another embodiment of the invention. The embodiment shown in FIG. 7 includes similar components to the turbocharger 200 for use with an internal combustion engine 202 illustrated in FIG. 2. Similar features of the embodiment shown in FIG. 7 are numbered similarly in series, with the exception of the features described below.

FIG. 7 schematically illustrates the turbocharger 700 for use with an internal combustion engine 702. The turbocharger 700 is in driving engagement and fluid communication with the internal combustion engine 702. The turbocharger 700 is in driving engagement with the internal combustion engine 702 through a differential device 780, a ratio adjusting device 706, and an infinitely variable transmission 708. Typically, the internal combustion engine 702 is used as a power source for a vehicle (not shown); however, it is understood that the internal combustion engine 702 may be used in other applications, such as in stationary power generation applications.

The turbocharger 700 includes a turbine portion 782, a compressor portion 784, the differential device 780, an output gear 713, and an output shaft 715. The turbine portion 782, the compressor portion 784, the differential device 780, the output gear 713, and the output shaft 715 are rotatably mounted within a housing 716 using a plurality of bearings (not shown). The output shaft 715 is also drivingly engaged with the internal combustion engine 702 through the ratio adjusting device 706 and the infinitely variable transmission 708; however, it is understood that the turbine portion 782 and the compressor portion 784 may be drivingly engaged internal combustion engine 702 in another manner that facilitates infinitely variable driving engagement therebetween.

The turbine portion 782 and the compressor portion 784 are drivingly engaged with the output shaft 715 through the differential device 780 and the output gear 713. As is known in the art, the turbine portion 782 is driven by exhaust gases via an exhaust port 718 of the internal combustion engine 702. The turbine portion 782 is drivingly engaged with the compressor portion 784 through the differential device 780 to provide compressed air to an intake port 720 of the internal combustion engine 702. The turbine portion 782 includes a first magnetic array 785 to facilitate driving engagement with the differential device 780. As shown in FIG. 7, the first magnetic array 785 is cylindrical in shape and is disposed within a portion of the differential device 780. The compressor portion 784 includes a second magnetic array 786 to facilitate driving engagement with the differential device 780. As shown in FIG. 7, the second magnetic array 786 is cylindrical in shape and is disposed within a portion of the differential device 780.

The differential device 780 comprises a first side gear 787, a second side gear 788, a differential carrier 789, a plurality of spider gears 790, a pair of intermediate ferrous members 791, and a differential housing 792. The first side gear 787, the second side gear 788, the differential carrier 789, and the plurality of spider gears 790 are disposed within the differential housing 792, which is rotatably disposed between the turbine portion 782 and the compressor portion 784. Each of intermediate ferrous members 791 is fixed with respect to the housing 716 and each is disposed between the first side gear 787 and the compressor portion 784 and the second side gear 788 and the turbine portion 782, respectively. The first side gear 787 and the second side gear 788 are bevel gears respectively disposed adjacent to and in magnetic driving engagement with the compressor portion 784 and the turbine portion 782. The first side gear 787 includes a third magnetic array 793 to facilitate driving engagement with the compressor portion 784. As shown in FIG. 7, the third magnetic array 793 is cylindrical in shape and is disposed about the second magnetic array 786 of the compressor portion 784. The second side gear 788 includes a fourth magnetic array 794 to facilitate driving engagement with the turbine portion 782. As shown in FIG. 7, the fourth magnetic array 794 is cylindrical in shape and is disposed about the first magnetic array 785 of the turbine portion 782.

The third magnetic array 793, one of the intermediate ferrous members 791, and the second magnetic array 786 form a magnetic drive ratio adjusting device, which is used to adjust a drive ratio between the compressor portion 784 and the first side gear 787. The magnetic drive ratio adjusting device is used to cause a speed reduction between the compressor portion 784 and the first side gear 787. It is understood that other magnetic arrangements may be used to cause a speed reduction between the compressor portion 784 and the first side gear 787.

The fourth magnetic array 794, one of the intermediate ferrous members 791, and the first magnetic array 785 form a magnetic drive ratio adjusting device, which is used to adjust a drive ratio between the turbine portion 782 and the second side gear 788. The magnetic drive ratio adjusting device is used to cause a speed reduction between the turbine portion 782 and the second side gear 788. It is understood that other magnetic arrangements may be used to cause a speed reduction between the turbine portion 782 and the second side gear 788. Further, it is understood that the principles of the magnetic drive ratio adjusting device may be applied to any of the embodiments of the invention described hereinabove.

The differential carrier 789 is a member in driving engagement with the differential housing 792. The plurality of spider gears 790 is rotatingly disposed on the differential carrier 789. The plurality of spider gears 790 are bevel gears each in driving engagement with the first side gear 787 and the second side gear 788 and facilitate a differential action therebetween. FIG. 7 illustrates the differential device 780 having two spider gears 790; however, it is understood that the differential device 780 may include three or more spider gears 790.

The differential housing 792 is a hollow member into which the first side gear 787, the second side gear 788, the differential carrier 789, and the plurality of spider gears 790 are disposed. An outer surface of the differential housing 792 includes a ring gear 795 coupled thereto. Alternately, it is understood that the ring gear 795 may be integrally formed with the differential housing 792. The ring gear 795 is in driving engagement with the output gear 713.

The output gear 713 is drivingly engaged with the ring gear 795 and the output shaft 715. The output gear 713 is rotatably disposed in the housing 716 and supported by bearings (not shown).

The output shaft 715 is a member drivingly engaged with the internal combustion engine 702 and the output gear 713. The output shaft 715 is drivingly engaged with the internal combustion engine 702 through the ratio adjusting device 706 and the infinitely variable transmission 708.

It is understood that the manner of providing driving engagement between the internal combustion engine 602, 702 and the differential device 670, 780 (through the use of the differential housing 678, 792, the ring gear 679, 795, and the output gear 613, 713) as described above and shown in FIGS. 6 and 7, may be adapted to provide driving engagement between the internal combustion engine 202, 302, 402, 502 and the differential device 204, 340, 450, 560.

In use, the turbocharger 200, 300, 400, 500, 600, 700 is drivingly engaged with the internal combustion engine 202, 302, 402, 502, 602, 702 through the infinitely variable transmission 208, 308, 408, 508, 608, 708 for at least two purposes: a first purpose is to allow the compressor portion 212, 312, 412, 512, 612, 784 to be at least partially driven by the internal combustion engine 202, 302, 402, 502, 602, 702; a second purpose is to allow the turbine portion 210, 310, 410, 510, 610, 782 to be drivingly engaged with the internal combustion engine 202, 302, 402, 502, 602, 702, or an output (not shown) thereof, through the infinitely variable transmission 208, 308, 408, 508, 608, 708. Further, the differential device 204, 340, 450, 560, 670, 780 allow for the turbine portion 210, 310, 410, 510, 610, 782 and the compressor portion 212, 312, 412, 512, 612, 784 to rotate at different speeds, which increases a performance of the turbocharger 200, 300, 400, 500, 600, 700.

Figure 8:
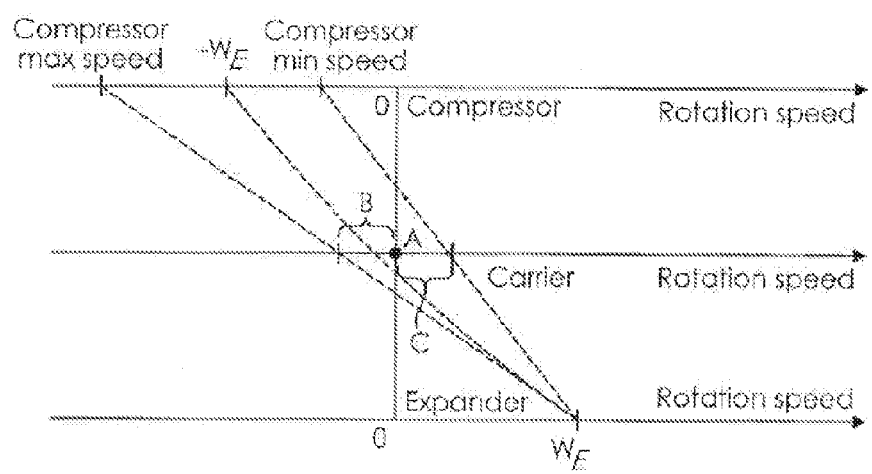
FIG. 8 is a speed diagram of the turbocharger according to any one of the embodiments of the present invention.

FIG. 8 illustrates an exemplary speed diagram of the compressor portion 212, 312, 412, 512, 612, 784, the carrier 226, 346, 457, 566, 676, 789, and the turbine portion 210, 310, 410, 510, 610, 782 of the differential device 204, 340, 450, 560, 670, 780 during three different modes of operation of the turbocharger 200, 300, 400, 500, 600, 700. A control system (not shown) in communication with the infinitely variable transmission 208, 308, 408, 508, 608, 708 is used to control a rotational speed of the carrier 226, 346, 457, 566, 676, 789 (and thus a rotational speed of the compressor portion 212, 312, 412, 512, 612, 784. The control system may adjust the infinitely variable transmission 208, 308, 408, 508, 608, 708 based on at least one of a driver action, a speed of a vehicle the turbocharger 200, 300, 400, 500, 600, 700 is incorporated in, a rotational speed of the compressor portion 212, 312, 412, 512, 612, 784, and a rotational speed of the turbine portion 210, 310, 410, 510, 610, 782. As a non-limiting example, the driver action may a throttle adjustment.

The three horizontal axes of FIG. 8 represent respectively, from top to bottom, a rotation speed of the compressor portion 212, 312, 412, 512, 612, 784 (and the side gear 222, 342, 452, 672, 787 or the drive ring 562), a rotation speed of the carrier 226, 346, 457, 566, 676, 789, and a rotation speed of the turbine portion 210, 310, 410, 510, 610, 782 (and the side gear 224, 344, 454, 674, 788 or the drive ring 564). The rotation speed of the turbine portion 210, 310, 410, 510, 610, 782, represented on the speed diagram as $W_E$, is determined by the exhaust gases flowing through the turbine portion 210, 310, 410, 510, 610, 782. Through the differential device 204, 340, 450, 560, 670, 780, the rotational speed of the compressor portion 212, 312, 412, 512, 612, 784 may be varied while keeping the rotational speed of the turbine portion 210, 310, 410, 510, 610, 782 substantially constant.

A first mode of operation of the turbocharger 200, 300, 400, 500, 600, 700 is represented on the speed diagram at point A. In the first mode of operation, the rotational speed of the carrier 226, 346, 457, 566, 676, 789 is substantially equal to zero, which is indicative that a ratio of the infinitely variable transmission 208, 308, 408, 508, 608, 708 is substantially equal to zero. In the first mode of operation, the compressor portion 212, 312, 412, 512, 612, 784 is rotating at the same speed as the turbine portion 210, 310, 410, 510, 610, 782, but in an opposite direction. In the first mode of operation, energy coming from the turbine portion 210, 310, 410, 510, 610, 782 is entirely applied to the compressor portion 212, 312, 412, 512, 612, 784, only with an opposite direction of rotation.

A second mode of operation of the turbocharger 200, 300, 400, 500, 600, 700 is represented on the speed diagram by a range of speeds at B. In the second mode of operation, the rotational speed of the carrier 226, 346, 457, 566, 676, 789 is a negative value (with respect to the turbine portion 210, 310, 410, 510, 610, 782). In the second mode of operation, energy is applied from the internal combustion engine 202, 302, 402, 502, 602, 702 to accelerate the compressor portion 212, 312, 412, 512, 612, 784 and to provide additional boost. Energy applied from the internal combustion engine 202, 302, 402, 502, 602, 702 reduces a turbo lag of the turbocharger 200, 300, 400, 500, 600, 700. Energy applied from the internal combustion engine 202, 302, 402, 502, 602, 702 is in addition to energy applied by the turbine portion 210, 310, 410, 510, 610, 782. The rotational speed of the carrier 226, 346, 457, 566, 676, 789 is the product of the speed of the internal combustion engine 202, 302, 402, 502, 602, 702, a ratio employed by the infinitely variable transmission 208, 308, 408, 508, 608, 708, and a ratio employed by the ratio adjusting device 206, 306, 406, 506, 606, 706. It is understood that each of the aforementioned ratios may be determined in order to increase an effectiveness of the turbocharger 200, 300, 400, 500, 600, 700.

A third mode of operation of the turbocharger 200, 300, 400, 500, 600, 700 is represented on the speed diagram by a range of speeds at C. In the third mode of operation, the rotational speed of the carrier 226, 346, 457, 566, 676, 789 is a positive value (with respect to the turbine portion 210, 310, 410, 510, 610, 782). In the third mode of operation, energy is applied from the turbine portion 210, 310, 410, 510, 610, 782 to the internal combustion engine 202, 302, 402, 502, 602, 702. The amount of energy applied from the turbine portion 210, 310, 410, 510, 610, 782 is a surplus amount of energy not required by the compressor portion 212, 312, 412, 512, 612, 784. In one example during the third mode of operation, substantially all or a very large percentage of energy from the turbine portion 210, 310, 410, 510, 610, 782 is applied to the carrier 226, 346, 457, 566, 676, 789, the ratio adjusting device 206, 306, 406, 506, 606, 706, the infinitely variable transmission 208, 308, 408, 508, 608, 708, and the internal combustion engine 202, 302, 402, 502, 602, 702. The third mode of operation allows energy to be recuperated and to be applied to the internal combustion engine 202, 302, 402, 502, 602, 702, or the output 232, 332, 432, 532, 632, 732 thereof. The rotational speed of the carrier 226, 346, 457, 566, 676, 789 is the product of the speed of the internal combustion engine 202, 302, 402, 502, 602, 702, a ratio employed by the infinitely variable transmission 208, 308, 408, 508, 608, 708, and a ratio employed by the ratio adjusting device 206, 306, 406, 506, 606, 706. It is understood that each of the aforementioned ratios may be determined in order to increase an effectiveness of the turbocharger 200, 300, 400, 500, 600, 700.

The turbocharger 200, 300, 400, 500, 600, 700 for use with the internal combustion engine 202, 302, 402, 502, 602, 702 offer many advantages over a conventional turbocharger. One advantage of the turbocharger 200, 300, 400, 500, 600, 700 is being able to direct the kinetic energy from the turbine portion 210, 310, 410, 510, 610, 782 to the internal combustion engine 202, 302, 402, 502, 602, 702 and an associated driveline (not shown). As a result of being able to recuperate energy, the internal combustion engine 202, 302, 402, 502, 602, 702 has an improved fuel economy. The turbocharger 200, 300, 400, 500, 600, 700 also minimizes a turbo lag by being able to apply energy from the internal combustion engine 202, 302, 402, 502, 602, 702 to the compressor portion 212, 312, 412, 512, 612, 784. The turbocharger 200, 300, 400, 500, 600, 700 also reduces a boost threshold by being able to provide energy from the internal combustion engine 202, 302, 402, 502, 602, 702 to the compressor portion 212, 312, 412, 512, 612, 784. The turbocharger 200, 300, 400, 500, 600, 700 also prevents a maximum boost pressure from being exceeded by being able to direct at least a portion of the energy recuperated in the turbine portion 210, 310, 410, 510, 610, 782 to the internal combustion engine 202, 302, 402, 502, 602, 702. Further, the turbocharger 200, 300, 400, 500, 600, 700 is able to adapt a speed of the compressor portion 212, 312, 412, 512, 612, 784 to achieve a required compression by adjusting a ratio of the infinitely variable transmission 208, 308, 408, 508, 608, 708.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A turbocharger for use with an internal combustion engine, the turbocharger comprising:
   a differential device having;
      a carrier in driving engagement with an infinitely variable transmission, the infinitely variable transmission in driving engagement with the internal combustion engine,
      a first side gear having a first plurality of magnets, and
      a second side gear having a second plurality of magnets;
   a compressor having a plurality of magnets in driving engagement with the first side gear of the differential device; and
   a turbine in driving engagement with the second side gear of the differential device;
   wherein the compressor is in magnetic driving engagement with the first side gear and the turbine is in magnetic driving engagement with the second side gear.

2. The turbocharger for use with the internal combustion engine according to claim 1,
   wherein the compressor and the first side gear form a first magnetic drive ratio adjusting device, and
   the turbine and the second side gear form a second magnetic drive ratio adjusting device.

3. The turbocharger for use with the internal combustion engine according to claim 1, further comprising a ratio adjusting device, the ratio adjusting device in driving engagement with the differential device and the infinitely variable transmission.

4. The turbocharger for use with the internal combustion engine according to claim 1, further comprising a plurality of spider gears, the plurality of spider gears in driving engagement with the first side gear and the second side gear of the differential device.

5. The turbocharger for use with the internal combustion engine according to claim 1, further comprising a differential housing, the first side gear and the second side gear of the differential device disposed within the differential housing, the differential housing in driving engagement with the infinitely variable transmission.

6. The turbocharger for use with the internal combustion engine according to claim 1, further comprising a ratio adjusting device, the ratio adjusting device in driving engagement with at least one of the compressor and the first side gear of the differential device and the turbine the second side gear of the differential device.

7. The turbocharger for use with the internal combustion engine according to claim 1, further comprising a plurality of spider gears including a plurality of magnets, wherein the plurality of spider gears are in magnetic driving engagement with the first side gear and the second side gear.

8. The turbocharger for use with the internal combustion engine according to claim 7, further comprising at least one intermediate ferrous member, the intermediate ferrous member disposed between the plurality of spider gears and one of the first side gear and the second side gear.

9. The turbocharger for use with the internal combustion engine according to claim 1, further comprising an output shaft, the output shaft in driving engagement with the differential device and the infinitely variable transmission.

10. The turbocharger for use with the internal combustion engine according to claim 9, wherein the output shaft passes through one of the compressor and the turbine.

11. A turbocharger for use with an internal combustion engine, the turbocharger comprising:
    a differential device having a carrier;
    a compressor in driving engagement with a first portion of the differential device;
    a turbine in driving engagement with a second portion of the differential device;
    an output shaft in driving engagement with the carrier;
    a first ratio adjusting device engaged with an infinitely variable transmission and the infinitely variable transmission is in driving engagement with the internal combustion engine; and
    a second ratio adjusting device in driving engagement with at least one of the compressor and the first portion of the differential device, and
        the turbine and the second portion of the differential device.

12. A turbocharger for use with an internal combustion engine, the turbocharger comprising:
    a differential device having a carrier portion;
    a compressor portion in driving engagement with a first portion of the differential device;
    a turbine portion in driving engagement with a second portion of the differential device;
    a first ratio adjusting device in driving engagement with at least one of the compressor portion and the first portion of the differential device and the turbine portion and the second portion of the differential device; and
    an output shaft in driving engagement with the carrier portion of the differential device and a second ratio adjusting device, the second ratio adjusting device in further engagement with an infinitely variable transmission, the infinitely variable transmission in driving engagement with the internal combustion engine.

13. A turbocharger for use with an internal combustion engine, the turbocharger comprising:
    a housing having a portion thereof filled with a shear thickening fluid;
    a differential device having a carrier portion, a plurality of balls rotatingly disposed onto the carrier portion, a first drive ring having an outer surface configured to contact a portion of each of the plurality of balls, and a second drive ring having an outer surface configured to contact a portion of each of the plurality of balls;
    a compressor portion in driving engagement with the first drive ring of the differential device; and
    a turbine portion in driving engagement with the second drive ring of the differential device, wherein the carrier portion of the differential device is in driving engagement with an infinitely variable transmission, the infinitely variable transmission in driving engagement with the internal combustion engine, the plurality of balls are in driving engagement with the first drive ring and the second drive ring through one of a boundary layer type friction and an elastohydrodynamic film, and the plurality of balls facilitate a differential action between the first drive ring and the second drive ring.

14. A turbocharger for use with an internal combustion engine, the turbocharger comprising:
    a differential device having a carrier portion, a plurality of magnetic bevel spider gears, a first magnetic bevel side gear magnetically engaged with the plurality of magnetic bevel spider gears, and a second magnetic bevel side gear magnetically engaged with the plurality of magnetic bevel spider gears;
    a compressor portion in driving engagement with the first magnetic bevel side gear of the differential device; and
    a turbine portion in driving engagement with the second magnetic bevel side gear of the differential device, wherein the carrier portion of the differential device is in driving engagement with an infinitely variable transmission, the infinitely variable transmission in driving engagement with the internal combustion engine.

15. A turbocharger for use with an internal combustion engine, the turbocharger comprising:
    a differential device having a carrier, having a first plurality of magnets and a second plurality of magnets;
    a compressor in driving engagement with the first plurality of magnets;
    a turbine in driving engagement with the second plurality of magnets;
    an output shaft in driving engagement with the carrier;
    a ratio adjusting device engaged with an infinitely variable transmission and the infinitely variable transmission is in driving engagement with the internal combustion engine.

16. A turbocharger for use with an internal combustion engine, the turbocharger comprising:
    a differential device having a carrier, a first drive ring and a second drive ring;
    a plurality of balls in driving engagement with the first drive ring and the second drive ring;
    a compressor portion in driving engagement with the first drive ring;
    a turbine portion in driving engagement with the second drive ring;
    an output shaft in driving engagement with the carrier; and
    a ratio adjusting device engaged with an infinitely variable transmission and the infinitely variable transmission is in driving engagement with the internal combustion engine.

* * * * *